United States Patent [19]

Cardenas et al.

[11] 4,270,607

[45] Jun. 2, 1981

[54] EMULSION OIL RECOVERY PROCESS USABLE IN HIGH TEMPERATURE, HIGH SALINITY FORMATIONS

[75] Inventors: Ricardo L. Cardenas; Bobby G. Harnsberger; Jim Maddox, Jr., all of Houston, Tex.

[73] Assignee: Texaco Inc., White Plains, N.Y.

[21] Appl. No.: 901,386

[22] Filed: May 1, 1978

[51] Int. Cl.$^3$ .............................................. E21B 43/22
[52] U.S. Cl. .................................... 166/273; 166/274; 252/8.55 D
[58] Field of Search ................... 252/8.55 D; 166/273, 166/274

[56] References Cited

U.S. PATENT DOCUMENTS

| | | | |
|---|---|---|---|
| 3,827,497 | 8/1974 | Dycus et al. | 252/8.55 X |
| 3,977,471 | 8/1976 | Gale et al. | 166/275 X |
| 4,018,278 | 4/1977 | Shupe | 166/274 X |
| 4,059,154 | 11/1977 | Braden et al. | 166/274 |
| 4,088,189 | 5/1978 | Shupe | 166/272 |
| 4,161,218 | 7/1979 | Varnon et al. | 166/273 X |

*Primary Examiner*—Herbert B. Guynn
*Attorney, Agent, or Firm*—Thomas H. Whaley; Carl G. Ries; Jack H. Park

[57] ABSTRACT

Many petroleum formations contain water having high salinity and/or high concentrations of divalent ions such as calcium or magnesium dissolved therein, and are additionally at temperature from about 70° F. to about 300° F. Most surfactants and polymers suitable for use in fluids or emulsions used in oil recovery operations are either ineffective in high salinity or high hardness waters, or cannot tolerate the higher temperatures encountered in many such formations. A water-external phase, viscous emulsion containing a water soluble and/or dispersible alkylpolyalkoxyalkylene sulfonate or alkylarylpolyalkoxyalkylene sulfonate and as a phase stabilizing additive, a water dispersable and/or soluble petroleum sulfonate, is an effective fluid for flooding oil formations containing brine whose salinity is from 70,000 to 220,000 parts per million total dissolved solids and also having temperatures as high as 300° F. The emulsion is phase stable over a wide range of formation temperatures and water salinities and hardness values.

19 Claims, No Drawings

EMULSION OIL RECOVERY PROCESS USABLE IN HIGH TEMPERATURE, HIGH SALINITY FORMATIONS

FIELD OF THE INVENTION

This invention concerns an oil recovery process and more specifically a surfactant-containing emulsion flooding oil recovery process. Still more specifically, this invention is concerned with an oil recovery process using a viscous, water-external phase emulsion comprising a dispersed hydrocarbon phase and a continuous aqueous phase, the emulsion containing a water dispersible and/or soluble alkylpolyalkoxyalkylene sulfonate or alkylarylpolyalkoxyalkylene sulfonate anionic surfactant and a water dispersable and/or soluble petroleum sulfonate, which emulsion is phase stable and suitable for flooding formations containing high concentrations of salt and/or divalent ions such as calcium and magnesium, the formations temperatures being in the range of from about 70° to about 300° F.

BACKGROUND OF THE INVENTION

Petroleum is normally recovered from subterranean formations in which it has accumulated, by penetrating the formation with one or more wells and pumping or permitting the petroleum to flow to the surface through these wells. Recovery of petroleum from formations is possible only if certain conditions exist in the formations. The petroleum should be present in the formation in an adequately high concentration, and there must be sufficient permeability or interconnected flow channels within the formation to permit the flow of fluids therethrough if sufficient pressure is applied to the fluid. When the formation has natural energy present in the form of an underlying active water drive, or gas dissolved in the petroleum to the producing well, or a high pressure gas cap above the petroleum-saturated portion of the formation, this natural energy is ordinarily utilized first to recover petroleum. Recovery of petroleum in this manner using natural energy is ordinarily referred to as primary recovery. When this natural energy source is depleted, or in the instance of those formations which do not contain sufficient natural energy initially to support primary recovery, some form of supplemental or enhanced recovery process must be applied to the formation in order to extract petroleum therefrom. Supplemental recovery is sometimes referred to as tertiary recovery, although in fact it may be primary, secondary or tertiary in sequence of employment.

Waterflooding, which involves the injection of water into the subterranean, petroleum-containing formation for the purpose of displacing petroleum toward the producing well, is the most economical and widely practiced supplemental recovery method. Water does not displace petroleum efficiently, however, since water and oil are immiscible and also because the interfacial tension between water and oil is quite high.

DESCRIPTION OF THE PRIOR ART

Persons skilled in the art of oil recovery have recognized the limitations of waterflooding and many additives have been described in the literature for incorporation in the flooding water to reduce the interfacial tension between the injected water and the formation petroleum. U.S. Pat. No. 2,233,381 (1941) discloses the use of polyglycol ethers as surface active agents or surfactants to increase the capillary displacement efficiency of an aqueous flooding medium. U.S. Pat. No. 3,302,713 discloses the use of petroleum sulfonates prepared from specified boiling range fractions of petroleum feedstock as a surfactant in surfactant flooding supplemental oil recovery operations. Other surfactants which have been proposed for oil recovery operations include alkylpyridinium salts, alkyl sulfates, alkylaryl sulfates, ethoxylated alkyl or alkylaryl sulfates, alkyl sulfonates, alkyaryl sulfonates, and quarternary ammonium salts.

The above described surfactants are satisfactory in certain limited applications, particularly in formations containing water whose salinity and hardness, i.e. concentration of divalent ions including calcium and magnesium, and/or temperature, are relatively low. For example, when the salinity of the formation water is less than about 30,000 parts per million and the concentration of divalent ions is less than about 200 to about 500 parts per million, petroleum sulfonates are very effective over a broad temperature range. U.S. Pat. Nos. 3,792,731; 3,811,504; 3,811,505; and 3,811,507 describe oil recovery processes employing specified mixtures of water soluble anionic and water soluble nonionic surfactants which exhibit satisfactory performance in petroleum formations containing water having high concentrations of divalent ions, i.e. in the concentration range of from about 500 to 18,000 parts per million calcium and magnesium, but cannot be used in formations whose temperature exceed about 150° F.

U.S. Pat. No. 3,508,612 describes an oil recovery method using an aliphatic polyethoxy sulfate and an organic sulfonate. U.S. Pat. No. 3,888,308 describes the use of an aqueous solution of an alkyl or alkylpolyethoxy sulfate as a mobility buffer. U.S. Pat. Nos. 3,827,497 and 3,890,239 describe an oil recovery process and a fluid containing an organic sulfonate and an alkylpolyethoxy sulfonate. U.S. Pat. No. 3,977,471 describes an oil recovery process and a substantially oil free fluid employing an alkylarylpolyalkoxyalkyl sulfonate in single surfactant mode.

Oil recovery processes employing a substantially oil-free aqueous fluid containing an alkylpolyethoxyalkyl sulfonate or alkylarylpolyalkoxyalkyl sulfonate are uniquely suitable for use in high temperature, high salinity reservoirs, but sometimes exhibit phase instability. U.S. Pat. No. 4,077,471 teaches that a low HLB, essentially water insoluble nonionic surfactant such as a polyethoxylated alkanol or polyethoxylated alkylphenol may be used in combination with the alkyl or alkylarylpolyalkoxyalkyl sulfonate to ensure phase stability of the aqueous fluid.

It is desirable that the viscosity of the oil recovery fluid be greater than water and preferably slightly greater than the crude oil present in the formation to ensure effective volumetric displacement. The use of microemulsions, emulsions and micellar dispersions which exhibit greater viscosities than true solutions of surfactant for oil recovery is taught in the prior art. For example, U.S. Pat. Nos. 3,971,439 and 3,994,342 teach oil recovery processes using microemulsions suitable for use in low salinity reservoirs. It is difficult to form an emulsion following the teachings of the prior art which is stable at high temperatures and in the presence of high salinity, however. Hydrophylic polymers may be incorporated in surfactant solutions to increase their viscosity, but most polymers are not stable at high temperatures or salinities and an interaction occurs between hydrophylic polymers and many surfactants, especially the ethoxylated and sulfonated surfactants which are especially suited for high temperature, high salinity formations.

In view of the foregoing discussion, it can be appreciated that there is a substantial, unfulfilled commercial need for an oil recovery method using a phase stable, viscous emulsion, microemulsion or micellar dispersion, which can be injected into formations whose temperatures are in excess of 100° F., up to 300° F. which formations also contain water having salinities higher than about 30,000 parts per million total dissolved solids, and/or concentrations of divalent ions greater than about 2,000 parts per million.

SUMMARY OF THE INVENTION

The present invention concerns an oil recovery process suitable for use in formations whose temperatures are from 70° F. to 300° F., which formations also contain water having high salinity and/or high hardness, e.g. salinities from 30,000 to 220,000 parts per million total dissolved solids which may include concentrations of divalent ions greater than about 2,000 parts per million. The oil recovery process involves injecting into the formation a viscous fluid which is an emulsion, microemulsion or micellar dispersion comprising a continuous aqueous phase and a discontinuous or dispersed non-aqueous phase. The emulsion contains the following surfactants dissolved or dispersed therein.

1. An alkylpolyalkoxyalkylene sulfonate or alkylarylpolyalkoxyalkylene sulfonate having the following structural formula:

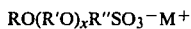

wherein R is a linear or branched aliphatic, alkyl or alkylaryl radical, having from 8 to 24 carbon atoms in the aliphatic or alkyl chain and preferably from 12 to 20 carbon atoms in the aliphatic or alkyl chain, $R'$ is ethylene or a mixture of ethylene and propylene with relatively more ethylene than propylene, preferably at least 60% ethylene, $R''$ is ethylene, propylene, hydroxypropylene or butylene, x is an integer from 1 to 20 and preferably from 2 to 8, and $M^+$ is a monovalent metallic cation such as sodium, potassium, or lithium, or an ammonium ion. The concentration of this surfactant in the emulsion is from 0.5 to 5.0 and preferably from 1.0 to 3.0 percent by weight.

2. The emulsion also contains from 0.01 to 1.0 and preferably from 0.05 to 0.5 percent by volume of an organic sulfonate which is water soluble and/or dispersible. For example, water soluble and/or dispersible sodium, potassium or ammonium salts or petroleum sulfonate having a mean equivalent weight in the range of 325–485 and preferably from 350–450 are preferred constituents. Linear or branched alkyl sulfonates having from 6 to 18 and preferably from 8 to 16 carbon atoms, or alkylaryl sulfonates such as benzene, toluene or xylene having attached thereto an alkyl chain, linear or branched and containing from 2 to 14 and preferably from 6 to 12 carbon atoms in the alkyl chain, represent another class of organic sulfonates suitable for use as an emulsion stabilizing additive for use in our oil recovery process.

The salinity of the emulsion is from 45–95% of the salinity of the formation water.

The non-aqueous discontinuous or dispersed phase, is a hydrocarbon such as crude oil, a distilled fraction of crude oil such as diesel oil or naphtha, or a $C_7$ to $C_{18}$ hydrocarbon. The volume percent hydrocarbon in the emulsion is from 0.5 to 20 and preferably from 2 to 10.0 volume percent.

DESCRIPTION OF THE PREFERRED EMBODIMENTS

The earliest and simplest forms of surfactant flooding described in the art employed an aqueous solution containing a sole primary anionic surfactant, which generally was a petroleum sulfonate. This material is effective only in formations containing relatively low salinity water, e.g. formation water whose salinity is less than about 30,000 parts per million total dissolved solids, and having less than about 200 to about 500 parts per million divalent ions such as calcium and magnesium dissolved therein. Since there are many oil-containing formations which contain appreciable amounts of unrecoverable oil and are otherwise suitable for surfactant flooding, which also contain water having salinites greater than 30,000 parts per million total dissolved solids, and more than 500 parts per million divalent ions dissolved therein, some modification of this relatively simple flooding procedure was required to permit application of surfactant flooding technology to a greater number of known petroleum reservoirs. Two basic approaches have evolved in the art. One approach requires that the high salinity formation water be first displaced from the formation by preflushing the formation with fresh water to ensure that the water present in the formation when the surfactant is injected is sufficiently fresh that a petroleum sulfonate can be utilized. The second approach makes use of a surfactant or combination of surfactants which are effective in the high salinity environment such as a combination of petroleum sulfonate or some other organic sulfonate as a primary anionic surfactant and a solubilizer such as an alcohol or a solubilizing co-surfactant such as a water soluble nonionic surfactant, e.g. a polyethoxylated alcohol or alkylphenol, or an alkylpolyethoxy sulfate or alkylarylpolyethoxy sulfate, or an alkylpolyethoxyalkylene sulfonate or alkylarylpolyethoxyalkylene sulfonate.

Preflushing the formation with fresh water has usually not successfully reduced the salinity of the formation water in all portions of the formation through which the surfactant solution will travel.

It has been discovered that certain materials which can be utilized as solubilizing co-surfactants, notably the alkylpolyethoxy sulfate or alkylarylpolyethoxy sulfate, or the alkylpolyalkoxyalkylene sulfonate or alkylarylpolyalkoxyalkylene sulfonate can also be utilized as a single surfactant i.e., without petroleum sulfonate or other organic sulfonate in solutions used for oil recovery purposes in high salinity solutions. These materials appear especially attractive because they are effective in the high salinity ranges in which most primary anionic surfactants such as petroleum sulfonate are not effective, e.g. in the range of from about 30,000 to about 220,000 parts per million total dissolved solids, and also the alkylpolyalkoxyalkylene sulfonate or alkylarylpolyalkoxyalkylene sulfonates are stable and active over a broad range of temperatures up to 300° F. whereas many nonionic surfactants such as ethoxylated alcohols or ethoxylated alkylphenols as well as alkylpolyethoxy sulfates or alkylarylpolyethoxy sulfates either become insoluble or hydrolyze at formation temperatures in excess of about 125° F.

The use of a single surfactant-containing solution where the sole surface active agent is an alkylpolyalkoxyalkylene sulfonate or alkylarylpolyalkoxyalkylene sulfonate has been found to exhibit an unexpected problem. Solutions prepared using this surfactant in high salinity environments sometime exhibit phase instability. The solutions when mixed in the desired concentration ranges, separate into two phases, which render the use of such materials ineffective and possibly hazardous to the formation, since injection of such phase unstable fluids into the formations causes ineffective oil displacement and may lead to plugging of small flow channels in a permeable oil formation. The cause of phase instability is not well understood and does not always occur.

Another problem encountered in using the polyethoxy sulfonates is an adverse interaction between the surfactant and hydrophilic polymers such as polysaccharides and partially hydrolyzed polyacrylamides frequently used in enhanced oil recovery processes to form viscous fluids to achieve good mobility ratios needed for efficient volumetric displacement.

The use of surfactant-containing water external emulsions, microemulsions or micellar dispersions for oil recovery purposes is also described in the prior art. These emulsions are more viscous than true solutions and so exhibit superior mobility ratios as compared to aqueous solutions. Most of the emulsions described in the art for oil recovery use employ petroleum sulfonates as the sole surfactant, which cause the emulsions to be unstable in the presence of high salinity and/or high divalent ion concentrations.

Considerable difficulty has been encountered in formulating a stable emulsion using the alkylpolyethoxyalkylene sulfonate or alkylarylpolyalkoxyalkylene sulfonate as the sole surfactant.

We have discovered that the use of a relatively small amount of a water soluble and/or dispersable organic sulfonate, as will be described in greater detail herein below, effectively stabilizes oil-in-water emulsions containing alkylpolyalkoxyalkylene sulfonate or alkylarylpolyalkoxyalkylene sulfonate.

The use of these materials in combination with the aliphatic polyalkoxylakylene sulfonate or alkylarylpolyalkoxyalkylene sulfonate stabilizes the emulsion sufficiently to permit the use of the emulsion for flooding in high salinity, high temperature environments, e.g. in petroleum formations whose temperatures are from 70° F. to 300° F. and which contain water whose salinity is from 30,000 to 220,000 parts per million total dissolved solids.

The specific emulsion utilized in the oil recovery process of our invention comprises a continuous aqueous phase and a dispersed non-aqueous phase. The emulsion containing from about 0.5 to about 5.0 and preferably from about 1.0 to about 3.0 percent by weight of an anionic surfactant having the following general formula:

$$RO(R'O)_xR''SO_3^-M^+$$

wherein R is an aliphatic radical such as an alkyl group, branched or straight chain, containing from 8 to 24 and preferably 12 to 20 carbon atoms, or an alkylaryl group such as benzene, toluene or xylene having attached thereto a linear or branched alkyl chain having from 2 to 14 and preferably from 6 to 12 carbon atoms in the alkyl chain, R' is ethylene or a mixture of ethylene and propylene with relatively more ethylene than propylene, preferably at least 60 percent ethylene;

x is an integer from 1 to 20 and preferably from 2 to 8,

R" is ethylene, propylene, hydroxypropylene or butylene, and

M+ is a monovalent cation such as ammonium or a monovalent metallic cation including sodium, potassium, and lithium. For example, a preferred surfactant for use in one in which R is a mixture of aliphatics having from 16 to 18 carbon atoms, R' is ethylene, x is 5, R" is ethylene, and M+ is sodium.

While the above surfactant is satisfactory alone for forming a viscous emulsion in brine having salinity of from 50,000 to 220,000 parts per million total dissolved solids, we have found that phase instability is encountered when the emulsion is stored for long periods of time at elevated temperatures, especially if the temperature exceeds 212° F. (100° C.). Accordingly, an emulsion stabilizing agent must also be incorporated in the emulsion. We have found that either of the following materials are effective for this purpose.

The emulsion should contain, in addition to the surfactant described above, from 0.01 to 1 and preferably from 0.05 to 0.5 percent by volume of an organic sulfonate which is water soluble and/or dispersible. For example, water soluble and/or dispersible sodium, potassium or ammonium salts of petroleum sulfonate having mean equivalent weights in the range of 325-485 and preferably from 350-450 are preferred organic sulfonates. Linear or branched alkyl sulfonates having from 6 to 18 and preferably from 8 to 16 carbon atoms, or alkylaryl sulfonates such as benzene, toluene or xylene having attached thereto an alkyl chain, linear or branched and containing from 2 to 14 and preferably from 6 to 12 carbon atoms in the alkyl chain, represent another preferred class of organic sulfonates suitable for use as an emulsion stabilizing additive for use in our oil recovery process.

The salinity and divalent ion concentration of the aqueous phase of the emulsion used in our process will ordinarily be from about 50 to 95 and preferably from 70 to 90 percent of the salinity and divalent ion concentration of the water present in the formation.

The dispersed or discontinuous phase of the emulsion comprises from 0.5 to 20.0 and preferably 2.0 to 10.0 percent by volume of a hydrocarbon such as crude oil.

In using combinations of petroleum sulfonate and alkyl- or alkylarylpolyalkoxyalkylene sulfonates in oil-free solutions, petroleum sulfonate is ordinarily considered to be the primary surfactant and its concentration usually exceeds the concentration of polyalkoxy sulfonate by 2:1 or more. Emulsions formulated using such ratios are not phase stable over long periods of time at high salinity and high temperatures. Emulsions formulated using alkyl- or alkyl- arylpolyalkoxyalkylene sulfonates alone are similarly unstable. Surprisingly, emulsions prepared using small amounts of petroleum sulfonate in combination with the "alkoxy" sulfonates are stable. Stability is achieved when the concentration of alkyl- or alkylarylpolyalkoxyalkylene sulfonate is from 0.5 to 5.0 wt/vol and the concentration of petroleum sulfonate is from 1 to 30 percent of the alkoxy sulfonate concentration.

In preparing an emulsion for use in a subterranean formation according to the process of our invention, the first step is to identify the optimum alkylpolyalkoxyalkylene sulfonate or alkylarylpolyalkoxyalkylene sulfonate for the particular environment in which it must function, the primary parameters of which are the formation water salinity and formation temperature. The operable materials must be identified by preparing emulsions with aqueous phases containing the alkylpolyalkoxyalkylene sulfonate or alkylarylpolyalkoxyalkylene sulfonate being considered and the organic sulfonate surfactant having the salinity and divalent ion concentration about 45-95 and preferably 70-90 percent of the salinity of the water in the formation into which the emulsion is to be injected, and determining whether the emulsions are phase stable for at least 7 days and preferably for at least 20 days at a temperature about equal to the temperature of the formation. If the emulsions are not phase stable, no further tests are needed since they will not be effective for oil recovery. If they are phase stable, they may or may not be effective for oil recovery, so oil recovery activity should be determined by measuring interfacial tension or other appropriate measurements at the formation temperature. The interfacial tension should be less than $1 \times 10^{-2}$ and preferably less than $5 \times 10^{-3}$ dynes per centimeter. Based on the results obtained, additional tests may be needed on emulsions prepared using surfactants having one or two fewer or additional ethylene oxide units per molecule. As a guideline, in formation brines having salinities around 200,000 parts per million total dissolved solids including 10,000 parts per million divalent ions, either of the following surfactants may be used in combination with petroleum sulfonate.

(1) Dodecylbenzenehexaethoxyethylene sulfonate or
(2) A $C_{16}$-$C_{20}$ linear alkylpentaethoxyethylene sulfonate.

The number of ethoxy groups per molecule of the surfactant may be reduced by 1-3 for use in a brine whose salinity is about 150,000 parts per million. These values should be considered as starting points for initial experimentation, however, and the final preferred species should be identified by trial and error, varying the number of ethoxy groups by (+ or −) 1 or 2. The essential part is to identify a surfactant wherein the balance between the oil soluble group (e.g. the number of carbon atoms in R in the above formula) and the water soluble groups (the number of ethoxy groups per moleculer, x in the above formula) is balanced so as to achieve the maximum emulsion stability at the formation temperature and salinity, as well as the desired low interfacial tension at the formation temperature and salinity. Also, the effect of concentration should be determined by examining emulsions having concentrations of at least 0.5, 1.0 and 2.0 percent by weight of the polyalkoxyalkylene sulfonate, with the concentration of the petroleum sulfonate being from 0.01 to 1 and preferably from 0.05 to 0.5 percent.

In the foregoing tests, phase stability is determined by mixing the samples of emulsion, storing them in quiescent state for at least 7 days at the temperature of the formation in which they are to be used. The samples are observed visually during this period to determine the number of days they are phase stable. Phase instability is noted by the presence of two or more separate phases, or layers which are sometimes quite distinct or there may be only a thin layer of surfactant visible near the top of the fluid.

If the emulsion is phase stable at or near the formation temperature and phase unstable at surface ambient temperature, the emulsion should be heated to a temperature near the formation temperature prior to injecting it into the formation.

Application of the above-described emulsion for oil recovery will otherwise utilize state-of-the-art surfactant waterflooding procedures. From 0.05 to 0.5 and preferably from 0.1 to 0.5 pore volume of emulsion will be injected into the formation. Sacrificial agents to prevent adsorption of surfactant may be injected before and/or with the emulsion. From 100 to 1500 parts per million hydrophilic polymer such as polyacrylamide or polysaccharide may be included in the emulsion and/or in an aqueous slug injected after the emulsion for mobility control, if the temperature of the formation permits use of polymers and if no adverse interaction occurs between the polymer and surfactants present in the emulsion. Since the viscosity of the emulsion is ordinarily significantly greater than the viscosity of a solution of surfactants, polymer use may be reduced significantly or eliminated altogether.

EXPERIMENTAL SECTION

For the purpose of demonstrating the method of identifying the preferred embodiments of the process of our invention and the oil recovery efficiency achieved as a result of application of the process of our invention, the following experimental work was performed.

In the course of designing an emulsion flooding process for use in an oil-containing formation whose temperature is 240° F., and which formation contains water having a salinity of 205,000 parts per million total dissolved solids including about 10,000 parts per million divalent ions, principally calcium and magnesium, an emulsion was formulated and found to exhibit excellent characteristics. The emulsion was formulated as follows.

An emulsion was prepared as follows. A solution of 2% (wt) EOR 100 ®, a sodium $C_{16}$-$C_{20}$ alkylpolyethoxy propylene sulfonate, was prepared in a brine having salinity of 164,000 parts per million total dissolved solids (equivalent to 80% of the formation brine). To this was added 0.12 vol. percent TRS-40 ®, a sodium salt of petroleum sulfonate having a median equivalent weight of 332, and 5% (vol) of crude oil to complete the emulsion. The emulsion was found to be stable at 240° F. (115° C.) for at least 30 days.

A series of core floods in a Berea Core was performed using different size slugs of this emulsion. All floods were carried out at 4 cc per hour and were followed by waterflooding with brine whose salinity was 164,000 ppm total dissolved solids. The oil recovery efficiency ($E_r$) for each flood is given in Table I below.

TABLE I

| | CORE FLOODS | |
|---|---|---|
| Run | Emulsion slug size Pore Volume Percent Vp | Oil Recovery Efficiency $E_r$ |
| 1 | 0.5 | 85.7 |
| 2 | 0.33 | 69.6 |
| 3 | 0.20 | 46.2 |
| 4 | 0.40* | 44.9* |

*Emulsion contained only 1% EOR 100 ®

All of the above results are considered excellent. Runs 3 and 4 indicate that oil recovery efficiency is not affected adversely by dilution of the emulsion so long as the volume of the slug is increased sufficiently so as to maintain the product of concentration and volume about equal.

Another series of core flood tests using an identical emulsion to that described above, to determine the compatibility of the emulsion with sacrificial agents employed to reduce loss of surfactant from the emulsion as it flows through a core of formation rock, due to adsorption or other factors. In each test, the volume of emulsion was 0.25 pore volume. The sacrificial agents tested were carboxymethyl cellulose, Mor Rex ® (a starch product), polyethylene glycol and guanidine acetate. The additive was incorporated in the emulsion, and in the core floods, the emulsion was displaced with 164,000 ppm salinity brine. In all cases, oil recovery increased but emulsion viscosity decreased when these sacrificial agents were present in the emulsion.

Another series of core displacement tests was run to determine the effect of oil content of the emulsion on oil recovery efficiency. All of the tests for which data are given in Table II below, the displacement fluid was prepared in a mixture of 80% field brine with deionized water to form a brine whose salinity was 164,000 ppm total dissolved solids. Two percent by weight of EOR 100 was added to the brine, together with 0.25 cc of TRS 40 ® petroleum sulfonate as a stability per 200 cc of brine. To this was added 0, 5, 10 and 20 cc of oil. The emulsions were used in core floods conducted in Berea cores using 0.20 pore volumes of emulsion injected at a rate of 4 cm³/hr, followed by injecting brine.

TABLE II

| | EFFECT OF OIL CONTENT OF EMULSION ON OIL RECOVERY | | |
|---|---|---|---|
| Run | Vol. Oil | %(Vol) Oil | % $E_r$ |
| 5 | 0* | — | 36.4 |
| 6 | 5 | — | 55.7 |
| 7 | 5 | — | 37.4 |
| 8 | 10 | — | 41.3 |
| 9 | 10 | — | 38.9 |
| 10 | 20 | — | 49.3 |
| 11 | 20 | — | 47.9 |

*Additional TRS-40 added to produce an emulsion.

The reason for the divergency of the above data is not understood but the general trend observed is that oil recovery efficiency increases with increased oil content in the emulsion used as the recovery fluid.

Another series of core floods was run to study the effect of tapering, (or decreasing in a smooth function) the salinity of the drive water, affected oil recovery efficiency. In all of these runs, oil was displaced from a 6″ Berea core by injecting 0.25 pore volumes of an emulsion prepared by adding 2% EOR 100 ® and 0.25 ml TRS 18 ® to 200 ml of 164,000 ppm salinity brine and then adding 10 ml of crude oil to form an emulsion. In run 12, the emulsion was displaced by brine whose salinity was held constant at 164,000 ppm. In run 13, the salinity of the brine injected into the emulsion was decreased from 164,000 to 0 over the time required to inject 0.29 pore volumes of drive fluid. In run 14, the brine injection was periodically interrupted and a 0.1 pore volume slug of deionized water was injected. The results are tabulated below.

TABLE III

| EFFECT OF DRIVE WATER SALINITY TAPERING ON OIL RECOVERY | | |
|---|---|---|
| Run | Type of Drive | Results |
| 12 | straight | Maximum oil recovery obtained after injecting 1.4 PV of fluid |
| 13 | tapered | (1) No increase in total oil recovery (2) Oil recovery obtained after injecting 1 PV of fluid. |

TABLE III-continued

| EFFECT OF DRIVE WATER SALINITY TAPERING ON OIL RECOVERY | | |
|---|---|---|
| Run | Type of Drive | Results |
| 14 | brine with intermittent deionized water slugs | Total oil recovery increased |

From the foregoing tests, it can be seen that tapering the salinity of the drive water from a value about equal to the salinity of the emulsion, to a value near zero (or at least below 100 ppm) during the course of injecting from 0.5 to 1 pore volumes, achieves the ultimate oil recovery sooner than if the salinity of the drive water is maintained constant. Injecting from 0.01 to 0.1 pore volumes of fresh water, e.g. salinity less than 1000 ppm, intermittently, e.g. after injecting from 0.1 to 0.5 pore volumes of brine, increases total recovery and achieves this recovery sooner than when the salinity of the drive fluid is not varied.

A core displacement test was performed to define the effect of core length on oil recovery achieved using our novel emulsion flooding process. The core employed was a 6.0 ft. (1.8 meter) Berea core which had not been used previously for oil recovery tests. The emulsion containing 1.90% EOR 100 ®, 0.11% TRS 40 ® petroleum sulfonate, and 4.76% oil. The salinity was 164,000 ppm total dissolved solids. Oil recovery after injecting 0.50 pore volume of emulsion and followed by 164,000 ppm brine to irreducable oil saturation was 64 percent. A 0.30 pore volume slug of fresh water was injected and then brine injection was resumed. After this fresh water injection, the oil recovery increased to 78 percent. Both of these values are considered excellent for an unused core of this length.

While our invention has been disclosed in terms of a number of illustrative embodiments, it is clearly not so limited since many variations thereof will be apparent to persons skilled in the art of enhanced oil recovery processes involving flooding with an emulsion without departing from the true spirit and scope of our invention. Similarly, while mechanisms have been mentioned for purposes of explaining the results obtained from the use of the process of our invention, it is not necessarily hereby represented that these are the only or even the principal mechanisms which are involved in application of the process of our invention, and it is not our desire or intention to be bound by any particular explanation or theory of the workings of the process of our invention. It is our intention and desire that our invention be limited and restricted only by those limitations and restrictions as appear in the claims appended hereinafter below.

We claim:

1. A method for recovering petroleum from a subterranean, permeable, petroleum-containing formation penetrated by at least one injection well and by at least one spaced-apart production well, both wells being in fluid communication with the formation, the temperature of the formation being from about 70° F. to about 300° F., said formation containing water having a salinity from 30,000 to 220,000 parts per million total dissolved solids, comprising:

(1) injecting into the formation via the injection well a viscous oil recovery fluid comprising a phase-stable surfactant-containing emulsion comprising:
(a) a continous, saline aqueous phase containing (1) from 0.5 to 5.0 percent by weight of a water soluble and/or dispersible alkylpolyalkoxyalkylene sulfonate or alkylarlypolyalkoxyalkylene sulfonate surfactant having the following formula:

$$RO(R'O)_xR''SO_3^- M^+$$

wherein R is an alkyl or alkylaryl group, linear or branched having from 8 to 24 carbon atoms in the alkyl chain, R' is ethylene or a mixture of ethylene and propylene having relatively more ethylene than propylene, x is a number from 1 to 20, R'' is ethylene, propylene, hydroxypropylene or butylene, and $M^+$ is a monovalent cation;

(2) a phase stabilizing amount in the range of from 0.01 to 1.0 percent by weight of an organic sulfonate which is water soluble and/or dispersible, the concentration of organic sulfonate being from 1 to 30 percent of the concentration of the alkylpolyalkoxyalkylene sulfonate or alkylarylpolyalkoxyalkylene sulfonate, said organic sulfonate being selected from the group consisting of water soluble and/or dispersible sodium, potassium or ammonium salts of petroleum sulfonate whose mean equivalent weight is from 325 to 485, and water soluble alkyl or alkylaryl sulfonate salts having the following formula:

$$RSO_3M$$

wherein R and M have the same meaning as above; and (3) said aqueous phase having a salinity from about 45 to 95 percent of the formation water salinity; and (b) a dispersed hydrocarbon phase;

(2) thereafter injecting brine into the formation after the emulsion, the salinity of the brine being initially from 45 to 100 percent of the formation water salinity and decreasing the salinity of the brine to a value less than 1000 parts per million total dissolved solids over the time of injecting from 0.5 to 1.0 pore volume of brine, said emulsion and brine displacing petroleum through the formation toward the production well; and (3) recovering petroleum displaced by the emulsion and brine from the formation via the production well.

2. A method as recited in claim 1 wherein R'' is ethylene.

3. A method as recited in claim 1 wherein R'' is propylene.

4. A method as recited in claim 1 wherein R'' is hydroxypropylene.

5. A method as recited in claim 1 wherein R'' is butylene.

6. A method as recited in claim 1 wherein $M^+$ is selected from the group consisting of sodium, potassium, lithium or ammonium.

7. A method as recited in claim 1 wherein the value of x is from 2 to 8.

8. A method as recited in claim 1 wherein R of element (1) is an alkyl or alkylaryl group having from 8 to 24 carbon atoms in the alkyl chain.

9. A method as recited in claim 1 wherein the concentration of the alkylpolyalkoxyalkylene sulfonate or alkylarylpolyalkoxyalkylene sulfonate is from 1 to about 3.0 percent by weight.

10. A method as recited in claim 1 wherein the organic sulfonate is a water soluble and/or dispersible sodium, potassium or ammonium salt of petroleum sulfonate having a median equivalent weight from 350 to 450.

11. A method as recited in claim 1 wherein the organic sulfonate is a water soluble and/or dispersible sodium, potassium or ammonium salt of alkyl sulfonate, wherein the alkyl is linear or branched and contains from 6 to 18 carbon atoms in the alkyl chain.

12. A method as recited in claim 1 wherein the organic sulfonate is a water soluble and/or dispersible sodium, potassium or ammonium salt of alkylaryl sulfonate selected from the group consisting of benzene, toluene or xylene having attached thereto an alkyl, linear or branched and containing from 6 to 18 carbon atoms in the alkyl chain.

13. A method as recited in claim 1 comprising the additional step of heating the emulsion to a temperature about equal to formation temperature prior to injecting it into the formation.

14. A method as recited in claim 1 wherein the discontinuous non-aqueous hydrocarbon phase is from 5 to 20 percent by volume of the emulsion.

15. A method as recited in claim 1 wherein the hydrocarbon is selected from the group consisting of crude oil, diesel oil, naphtha, kerosene, natural gasoline, hydrocarbons having from 7 to 18 carbon atoms, and mixtures thereof.

16. A method as recited in claim 1 wherein the salinity of the aqueous phase is from 70 to 90 percent of the salinity of the water in the formation.

17. A method as recited in claim 1 comprising the initial step of balancing R and x in the formula $R(R'O)_xR''SO_3^- M^+$ so the emulsion is phase stable at the formation temperature for at least 7 days and reduces the interfacial tension to a value less than $1\times 10^{-2}$ dynes per centimeter.

18. A method for recovering petroleum from a subterranean, permeable, petroleum-containing formation penetrated by at least one injection well and by at least one spaced-apart production well, both wells being in fluid communication with the formation, the temperature of the formation being from about 70° F. to about 300° F., said formation containing water having a salinity from 30,000 to 220,000 parts per million total dissolved solids, comprising:

(a) a continous, saline aqueous phase containing
(1) from 0.5 to 5.0 percent by weight of a water soluble and/or dispersible alkylpolyalkoxyalkylene sulfonate or alkylarylpolyalkoxyalkylene sulfonate surfactant having the following formula:

$$RO(R'O)_xR''SO_3^- M^+$$

wherein R is an alkyl or alkylaryl group, linear or branched having from 8 to 24 carbon atoms in the alkyl chain, R' is ethylene or a mixture of ethylene and propylene having relatively more ethylene than propylene, x is a number from 1 to 20, R'' is ethylene, propylene, hydroxypropylene or butylene, and $M^+$ is a monovalent cation;

(2) a phase stabilizing amount in the range of from 0.01 to 1.0 percent by weight of an organic sulfonate which is water soluble and/or dispersable, the concentration of organic sulfonate being from 1 to 30 percent of the concentration of the alkylpolyalkoxyalkylene sulfonate or alkylarylpolyalkoxyalkylene sulfonate, said organic sulfonate being selected from the group consisting of water soluble and/or dispersable sodium, potassium or ammonium salts of petroleum sulfonate whose mean equivalent weight is from 325 to 485, and water soluble alkyl or alkylaryl sulfonate salts having the following formula:

RSO$_3$M wherein R and M have the same meaning as above;
(3) said aqueous phase having a salinity from about 45 to 95 percent of the formation water salinity; and (b) a dispersed hydrocarbon phase;
thereafter injecting a plurality of slugs of brine into the formation after the emulsion to drive the emulsion through the formation, the salinity of the brine being from 45 to 100 percent of the formation water salinity, the volume of each brine slug being from 0.5 to 1.0 pore volumes, and injecting a slug of from 0.01 to 0.10 pore volumes of fresh water between each slug of brine, said emulsion, brine and fresh water displacing petroleum through the formation toward the production well; and
(3) recovering petroleum from the formation via the production well.

19. A method as recited in claim 18 wherein the salinity of the slugs of fresh water is less than 1000 parts per million total disolved solids.

* * * * *